Jan. 22, 1924.
J. E. HARRISON
FISHING TOOL
Filed Jan. 19, 1923
1,481,259
2 Sheets-Sheet 1
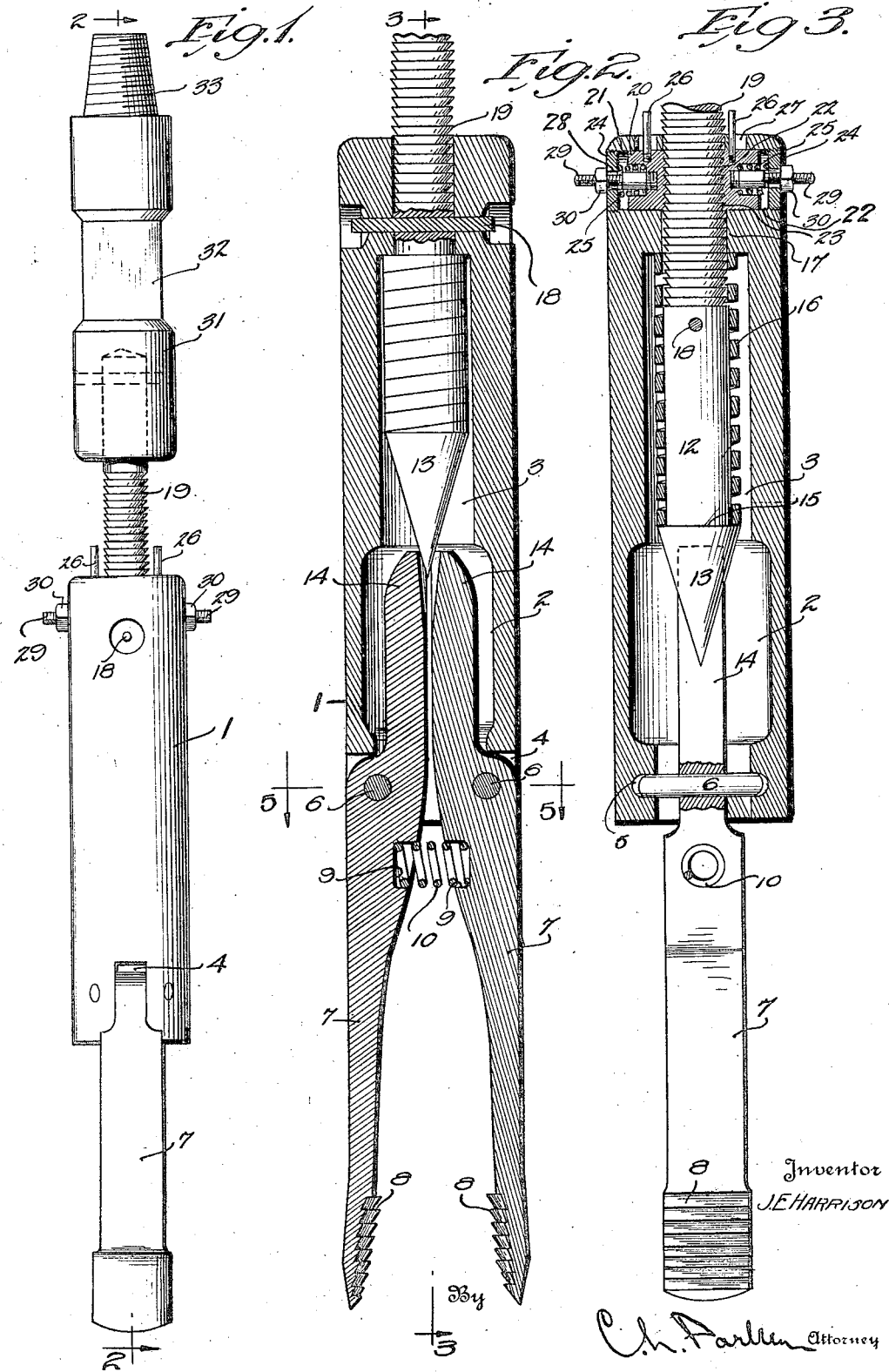
Inventor
J.E.HARRISON Jan. 22, 1924. 1,481,259
J. E. HARRISON
FISHING TOOL
Filed Jan. 19, 1923 2 Sheets-Sheet 2
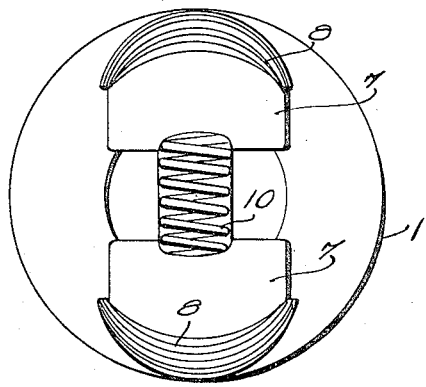
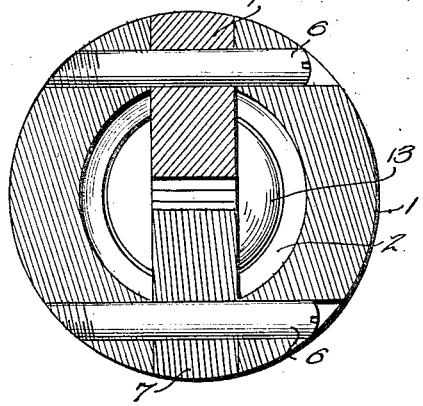
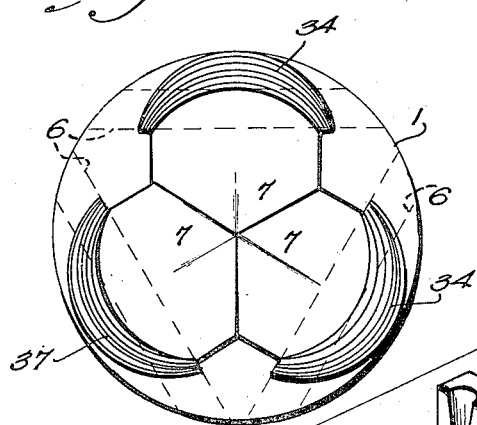
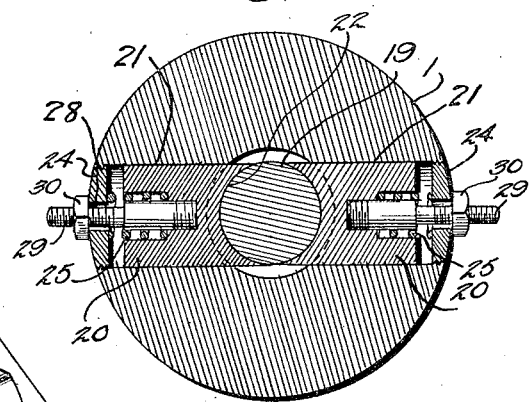
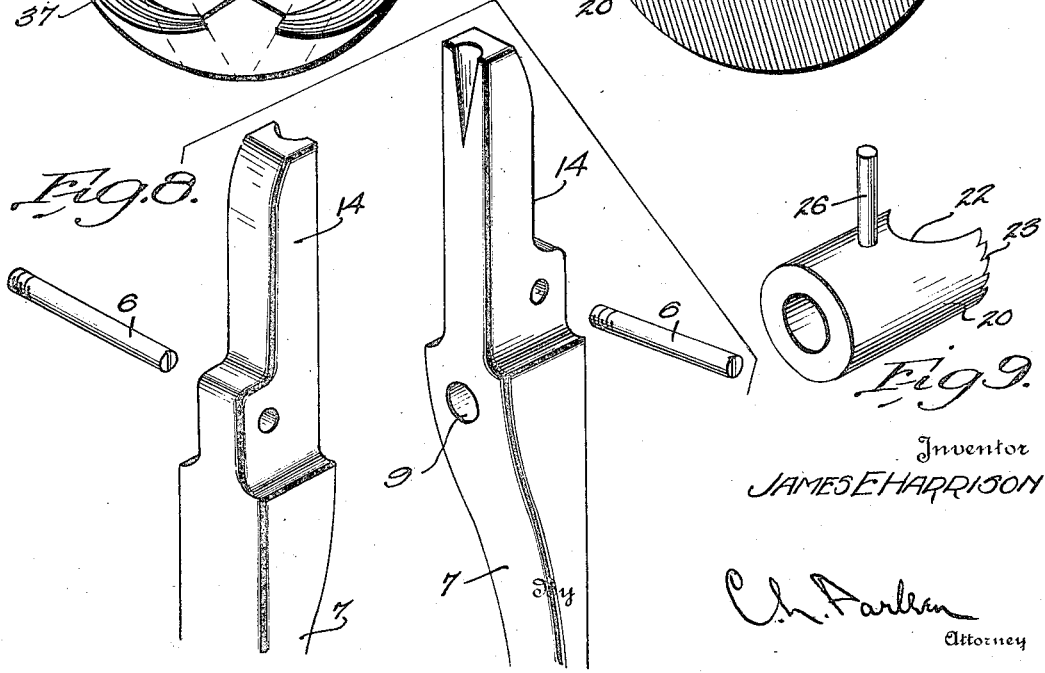
Inventor
JAMES E HARRISON
Attorney Patented Jan. 22, 1924.

1,481,259

UNITED STATES PATENT OFFICE.

JAMES E. HARRISON, OF ARDMORE, OKLAHOMA.

FISHING TOOL.

Application filed January 19, 1923. Serial No. 613,676.

*To all whom it may concern:*

Be it known that I, JAMES E. HARRISON, a citizen of the United States, residing at Ardmore, in the county of Carter and State of Oklahoma, have invented certain new and useful Improvements in Fishing Tools, of which the following is a specification.

This invention relates to fishing tools for removing obstructions from wells.

An object of the invention is the provision of spring actuated means for operating the gripping jaws when the fishing tool is lowered into the well and an obstruction encountered.

A further object is the provision of means for normally restraining the operating means.

A further object is the provision of means for locking the operating means to prevent the gripping jaws from opening after the obstruction has been seized by the jaws.

In the accompanying drawings, I have shown several embodiments of the invention. In this showing:

Figure 1 is a side elevation of one form of fishing tool,

Figure 2 is a vertical sectional view on line 2—2 of Figure 1,

Figure 3 is a similar view on line 3—3 of Figure 2,

Figure 4 is a bottom plan view of the tool,

Figure 5 is a detail horizontal sectional view on line 5—5 of Figure 2,

Figure 6 is a similar view on line 6—6 of Figure 3,

Figure 7 is a bottom plan view of another form of the invention,

Figure 8 is a detail view of the jaws shown in Figures 1 to 6 of the drawings, and, Figure 9 is a perspective view of the locking mechanism.

Referring to the drawings, the reference numeral 1 designates a socket which is hollow and open at the bottom end, as shown. Adjacent the bottom, the interior of the socket is enlarged, as at 2, the upper portion 3 being of smaller diameter. The lower edge of the socket is provided with a pair of diametrically opposed slots 4. The side walls of these slots are provided with recesses 5 for the reception of the ends of pivot pins 6. Jaw members 7 are pivotally mounted on these pins. These jaw members may be of any desired shape. As shown, they are provided with teeth 8, adjacent the lower end adapted to engage an obstruction in the well. The inner faces of the jaw members are provided with recesses 9 below the pivots adapted to receive a coil spring 10 by means of which the jaw members are normally retained in spaced relation. A plunger 12 is mounted in the upper part of the socket. When the jaws are in spread position, the plunger is lifted, as shown in Figure 2 of the drawings. The lower end of the plunger is pointed, as at 13, and is adapted to be received between the upper ends 14 of the jaws to spread the upper ends of the jaws and thus close the lower ends of the jaws. The plunger is provided with a shoulder 15 immediately above the pointed end and a coil spring 16 is adapted to be arranged around the plunger between this shoulder and a transverse wall 17 adjacent the top of the socket. When the plunger is in raised position, the spring is retained under compression. The plunger is retained in this position by means of a pin 18, of soft metal, which passes through an opening in the plunger and through openings in the sides of the socket. The upper portion of the plunger is provided with ratchet teeth 19. Suitable locking members are adapted to engage these teeth to prevent upward movement of the plunger. As shown, locking members 20 are arranged in recesses 21, adjacent the top of the socket. These locking members are provided with arcuate inner faces 22, curved on a radius substantially equal to the radius of the plunger and provided with teeth 23. Plates 24 are arranged in the faces of the socket, slightly spaced from the locking members. Coil springs 25 are arranged between the locking members and the plates 24 to retain the locking members in engagement with the teeth 19 of the plunger. Suitable guide members 26 extend upwardly from the locking members through slots 27 in the top of the socket. The plates 24 are provided with openings 28 for the passage of bolts 29. These bolts are received in threaded openings in the locking members and are provided with nuts 30, arranged interiorly of the socket and of larger diameter than the openings 28. The upper end of the plunger is adapted to be received in a threaded opening in the bottom of a coupling 31, generally referred to in the art as a sub. This member is provided with a squared portion 32 for the reception of a wrench. The upper end of this member is provided with a threaded extension 33 adapted to receive a section of a drill rod or the like.

In operation, the parts are arranged as shown in Figure 2 of the drawings, with the plunger in raised position and the pin passing through the plunger and the wall of the socket. The spring 16 is then under compression. With the parts in this position, the fishing tool is placed on the end of a string of tools or drill rod and lowered into a well. When the tool strikes an obstruction, the jaws are adapted to straddle it. The lower ends of the jaws are spaced from each other a greater distance than the portion adjacent the pivot and as the obstruction moves into the space between the jaws, the downward movement of the tool is arrested. The tool is then raised and lowered with a quick snapping action, which shears the soft metal pin 18 and permits the spring to force the plunger downwardly. The pointed end 13 then enters the space between the upper ends 14 of the jaws and spreads the upper ends of the jaws, thus closing the lower ends. When the obstruction has been grasped, it is then lifted from the well, the locking members 20 engaging the teeth 19 and preventing upward movement of the plunger. To reset the tool, the nuts 30 are tightened on the bolts 29, withdrawing the locking members and permitting upward movement of the plunger. The plunger is then moved upwardly until the opening for the pin 18 is in alinement with the openings in the wall of the socket and a new pin inserted, holding the spring 16 under compression.

As stated, any type of gripping jaws may be employed and in Figure 7 of the drawings, I have shown a tool provided with three jaws 34. These jaws are mounted on suitable pivots (not shown) in the lower end of the socket.

It is to be understood that the forms of the invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. In a device of the character described, a socket, a pair of gripping jaws pivotally mounted in said socket, a movable plunger mounted in said socket above said jaws and adapted to close said jaws when in lowered position, means for normally retaining said plunger in raised position, and a spring to lower said plunger when said retaining means are released.

2. In a device of the character described, a socket, a pair of gripping jaws pivotally mounted in said socket, a movable plunger mounted in said socket above said jaws and adapted to close said jaws when in lowered position, a severable pin passing through said socket and said plunger to normally retain said plunger in raised position, and a spring adapted to lower said plunger when said pin is severed.

3. In a device of the character described, a socket, a pair of jaw members pivotally mounted in the lower end of said socket, said jaw members being provided with extensions within said socket and above their pivots, a plunger arranged in said socket above said extensions, said plunger being provided with a lower tapered end adapted to be received between said extensions to spread them and close the lower ends of said jaws, a severable pin normally retaining said plunger in raised position, and a spring adapted to lower said plunger when said pin is severed.

4. In a device of the character described, a socket, jaw members pivotally mounted in the lower end of said socket, said jaw members being provided with extensions above their pivots arranged in said socket, a plunger arranged in said socket above said extensions, said plunger being provided with a lower tapered end adapted to be received between said extensions to spread them and close the lower ends of said jaws, a severable pin normally retaining said plunger in raised position, a spring adapted to lower said plunger when said pin is severed, and means for preventing upward movement of said plunger.

In testimony whereof, I affix my signature in presence of two witnesses.

JAMES E. HARRISON.

Witnesses:
DANIEL S. HARRISON,
J. R. CLARK.